United States Patent [19]
Ball et al.

[11] Patent Number: 5,691,999
[45] Date of Patent: Nov. 25, 1997

[54] COMPRESSION-TUNED FIBER LASER

[75] Inventors: Gary A. Ball, Simsbury; William W. Morey, West Hartford, both of Conn.

[73] Assignee: United Technologies Corporation, Hartford, Conn.

[21] Appl. No.: 316,281

[22] Filed: Sep. 30, 1994

[51] Int. Cl.$^6$ ........................................... H01S 3/10
[52] U.S. Cl. ................................. 372/20; 372/6
[58] Field of Search ........................... 372/20, 6, 28, 372/32, 92, 99

[56] References Cited

U.S. PATENT DOCUMENTS

| | | | |
|---|---|---|---|
| 4,951,285 | 8/1990 | Cole et al. | 372/99 |
| 4,972,428 | 11/1990 | Hinz et al. | 372/99 |
| 5,132,979 | 7/1992 | Erbert | 372/99 |
| 5,138,628 | 8/1992 | Pocholle et al. | 372/99 |
| 5,159,601 | 10/1992 | Huber | 372/20 |
| 5,291,502 | 3/1994 | Pezeshki et al. | 372/20 |
| 5,305,335 | 4/1994 | Ball et al. | 372/6 |
| 5,317,576 | 5/1994 | Leonberger et al. | 372/6 |
| 5,339,324 | 8/1994 | Eguchi et al. | 372/92 |

FOREIGN PATENT DOCUMENTS

| | | |
|---|---|---|
| 0 435 217 A3 | 7/1991 | European Pat. Off. |
| 0435217 | 7/1991 | European Pat. Off. |
| WO 88/05614 | 7/1988 | WIPO |
| WO 91/10151 | 7/1991 | WIPO |

OTHER PUBLICATIONS

Electronic Letters, vol. 29, No. 18, 2 Sep. 1993, pp. 1623–1624, G. A. Ball et al, "Low Noise Single Frequency Linear Fibre Laser".

IEEE Photonics Technology Letters, vol. 6, No. 2, Feb. 1994, pp. 192–194, G. A. Ball et al., "60 MW 1.5 μm Single–Frequency Low–Noise Fiber Laser MOPA".

International Search Report for PCT/US95/12120, mailed 24 Jan. 1996; for the PCT application that corresponds to United States Application 08/316,281 (the present application).

Primary Examiner—Rodney B. Bovernick
Assistant Examiner—Robert E. Wise
Attorney, Agent, or Firm—Gerald L. DePardo

[57] ABSTRACT

A fiber laser 26 including a rare-earth doped fiber laser cavity 32 delimited by a pair of reflective elements 28,30, such as Bragg gratings, is tuned by compressing the cavity 32 and the gratings 28,30. Because an optical fiber is a much stronger under compression than in tension, the laser 26 is tunable over a much broader range than conventional tension/stretching techniques.

11 Claims, 4 Drawing Sheets

COMPRESSION-TUNED FIBER LASER

CROSS REFERENCES TO RELATED APPLICATIONS

U.S. patent application Ser. No. 08/316,183 now U.S. Pat. No. 5,469,520, entitled "Compression Tuned Fiber Grating," filed contemporaneously herewith, contains subject matter related to that disclosed herein.

TECHNICAL FIELD

This invention relates to fiber lasers and more particularly to tuned fiber lasers.

BACKGROUND ART

It is known in the art of fiber lasers to create a tunable fiber laser by impressing a pair of Bragg gratings into an optical fiber. The gratings are separated by a section of fiber which is doped with a rare earth dopant (e.g., erbium). Such a laser is described in U.S. Pat. No. 5,317,576 entitled "Continuously Tunable Single-Mode Rare-Earth Doped Pumped Laser Arrangement," to Ball et al. Such a tunable laser is a single lasing wavelength laser which is continuously wavelength tunable, without longitudinal mode hopping.

A Bragg grating fiber laser can have its lasing wavelength tuned (or changed) by stretching the laser cavity as well as the gratings. For example, one technique used is to attach the laser to a piezoelectric stretcher (or tuner) which expands as a function of voltage applied to it or to wrap the laser around a cylindrical mandrel which expands when voltage is applied, as described in the aforementioned U.S. patent.

However, the amount that the fiber may be stretched (or tensile strained), and thus maximum wavelength tuning range, is limited by the tensile strength of the fiber. In particular, when a Bragg grating is stretched, the Bragg grating reflection wavelength change is about 1.2 nanometer (nm)/millistrain in the 1.55 micron wavelength lasing region, due primarily to physical expansion and a strain-optic effect, as is known. Typical communications-grade optical fibers and waveguides are made of Silica or Silicon Dioxide ($SiO_2$) which has a Young's modulus of $1.02 \times 10^7$ PSI. Therefore, for a typical optical fiber which is proof tested at 50 kpsi, a maximum safe long-term safe long-term strain of approximately ½% (($\Delta L/L$)*100; where L is the length of fiber stretched) can be applied without degrading the fiber strength which would eventually cause the fiber to break. This limits the maximum amount of tensile strain laser wavelength tuning to about 5 nanometers.

Alternatively, fiber lasers have been tuned by thermal variation. In that case, the laser cavity and the Bragg gratings are heated which cause these elements to expand and experience a change in refractive index. The change in Bragg reflection wavelength to temperature is approximately 0.011 nm/degree Celsius. The primary adverse effect of thermal tuning is degradation in the amount of reflectivity of the Bragg grating, which is caused by thermal annealing. Such degradation causes the laser resonator characteristics to change, thereby altering the laser response. Depending on the particular fiber, fabrication techniques, fiber coating and grating requirements, significant grating degradation can occur at temperatures above the 100–200 degree Celsius range, thereby limiting practical tuning of the fiber laser to about 1 nanometer.

Because the bandwidth of the gain medium for the fiber laser is typically much broader than 10 nanometers, e.g., 40–50 nm for erbium, current fiber laser tuning techniques do not provide the maximum range of tunability over the laser gain bandwidth.

Therefore, it is desirable to obtain a fiber laser which is tunable over a large portion of the gain bandwidth of the laser and is relatively simple to implement.

DISCLOSURE OF INVENTION

Objects of the invention include provision of a broadly wavelength-tunable fiber laser.

According to the present invention a broadly tunable laser comprises a laser cavity comprising an optical waveguide; the waveguide being doped with a rare-earth dopant which provides a gain medium within the laser cavity; a pair of reflective elements delimiting the laser cavity; the length of the laser cavity, the gain of the gain medium, and the reflectivity of the reflective elements being so as to cause lasing to occur at a predetermined lasing wavelength; the reflective elements reflecting light at the lasing wavelength; and compression means for compressing the laser cavity so as to change the lasing wavelength.

According further to the present invention, the reflective elements comprise at least one Bragg grating having a central reflection wavelength and the compression means also compresses the grating thereby changing the reflection wavelength of the grating to correspond to the current lasing wavelength.

The invention represents a significant improvement over prior wavelength tunable fiber lasers by the discovery that using compressive stress as opposed to tensile stress (i.e., stretching the laser) allows the fiber laser to be continuously tuned, without mode-hopping, over about a much broader range, e.g., 32 nanometers (nm), which is a significant portion of the 40–50 nm erbium doped fiber laser bandwidth. This is due in large part because the optical fiber is 23 times stronger under compression than tension, thereby allowing for a much larger wavelength-tunable range from that of the prior art. Also, we have found that the tuning is repeatable in both directions (i.e., compression and relaxation).

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
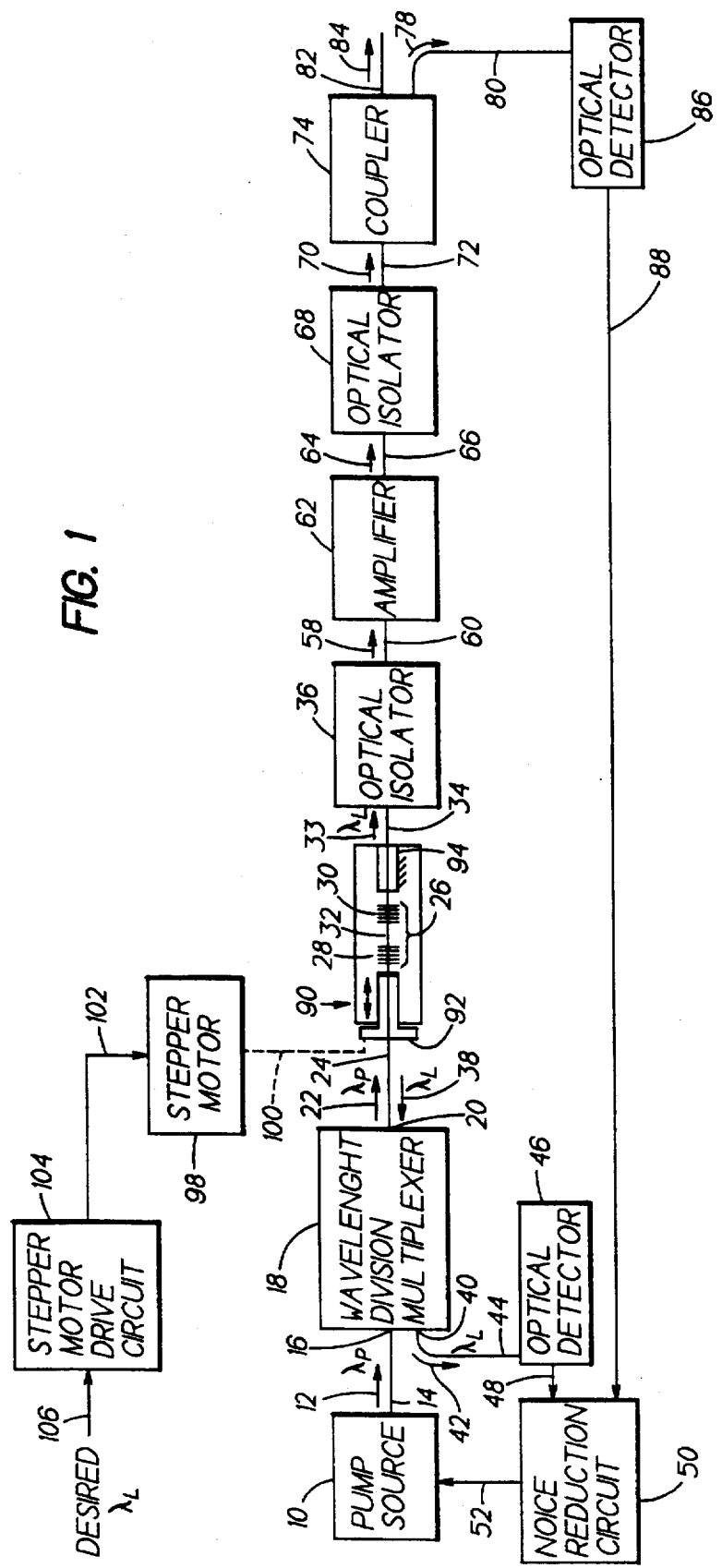
FIG. 1 is a schematic block diagram of an embodiment of a compression tuned fiber laser, in accordance with the present invention.

Referring to FIG. 1, a pump source 10, e.g., a laser diode, provides an optical pump light signal 12 on an optical fiber 14, comprising a pump wavelength $\lambda_P$, e.g., 1480 nanometers (nm). The pump signal 12 is fed to a port 16 of a known wavelength division multiplexer (WDM) 18. The optical pump signal 12 is coupled to the output port 20 of the WDM 18 as an optical signal 22 on a fiber 24. The optical fiber 24 is fed to a fiber laser 26 comprising a pair of Bragg gratings 28,30 spaced apart by a section 32 of rare-earth doped optical fiber (e.g., erbium doped fiber) made of $SiO_2$ having a diameter of about 125 microns. The fiber laser is similar to that described in U.S. Pat. No. 5,305,335 entitled "Single Longitudinal Mode Pumped Optical Waveguide Laser Arrangement;" however, any wavelength tunable fiber laser may be used if desired. The fiber laser 26 provides an output light 33 along a fiber 34 at a lasing wavelength $\lambda_L$, e.g., having a lasing range of about 1530–1570 nm, to an optical isolator 36 which prevents light from re-entering the laser 26 and disrupting the laser operation. It should be understood that the fibers 24,32,34 may all be one contiguous optical fiber with the Bragg gratings 28,30 embedded therein. Also, it should be understood that, to maximize the tuning range, the laser in the non-compressed state may lase at about 1570 nm and tune toward 1530 nm under compression.

The fiber laser 26 also provides a feedback (or back) optical light signal 38 at the lasing wavelength $\lambda_L$ along the fiber 24 which enters the WDM 18 at the port 20. The signal 38 exits the WDM 18 at a port 40 of the WDM as indicated by a line 42 on a fiber 44. The fiber 44 is fed to an optical detector 46 which provides an electrical signal on a line 48 indicative of the intensity of the optical signal 42 incident thereon.

The line 48 is fed to an active feedback laser noise reduction circuit 50 discussed more hereinafter.

The optical signal 33 exits the optical isolator 36 as an optical signal 58 on a fiber 60. The fiber 60 is fed to an optical amplifier 62, e.g., a predetermined length (15 meters) of optical fiber doped with a predetermined dopant such as erbium, which absorbs the residual pump power from the laser 26, provides amplification the optical signal 58 at the lasing wavelength $\lambda_L$ and provides an amplified optical signal 64 on an optical fiber 66. The fiber 66 is fed to a second optical isolator 68 which prevents light from entering the optical amplifier 62 from the reverse direction. The optical signal 64 exits the isolator 68 as the signal 70 on an optical fiber 72.

The fiber 72 is fed to an optical coupler 74 which couples a predetermined amount of the input light 70 (e.g., approximately 1%) onto an optical fiber 80 as indicated by a line 78. The remaining portion of the light 70 is coupled to a fiber 82 as an output signal 84. The fiber 80 is fed to an optical detector 86 which provides an electrical signal on a line 88 indicative of the intensity of the light 78 incident thereon. The line 88 is also fed to the noise reduction circuit 50.

The noise reduction circuit 50 comprises known control electronics and provides an electrical signal on a line 52 to the pump source 10 which adjusts the pump source 10 (typically the current to a laser diode) so as to provide substantially constant output light signal 84. A feedback control laser configuration and a noise reduction circuit similar that shown herein is discussed in co-pending U.S. patent application Ser. No. 08/250,966, entitled "Programmable Fiber Optic Delay Line," and as is discussed in the articles Ball et al, "Low Noise Single Frequency Linear Fibre Laser," Electronic Letters, Vol. 29, No. 18, pp 1623–1624 (Sept. 1993) and Ball et al, "60 mW 1.5 µm Single-Frequency Low-Noise Fiber Laser MOPA," IEEE Photonics Tech. Letters, Vol. 6, No. 2 (Feb. 1994).

More specifically, the electrical signals on the lines 48,88 from the detectors 46,86 act as optical feedback for inner and outer control loops, respectively. In particular, the electrical signal on the line 48 is fed to an inner PD (proportional plus differential) controller loop, well known in the art. The electrical signal of the line 88 from the detector 86 is fed to a known integral (or isochronous) control compensation outer loop. The signals on both lines contribute to adjusting the drive signal 52 to the pump source 10. The purpose of the dual-loop control is to provide constant output amplitude of the output light 84 over the tuning range of the fiber laser 26 which would not exist otherwise due to variations in gain over the tuning bandwidth of the doped cavity 32 as well as over the gain bandwidth of the amplifier 62.

It should be understood that the invention will work equally well with only a single (inner or outer loop) feedback or with no feedback if constant output intensity or reduced noise is not required or if the laser gain curve is flat. Further, the invention will work equally well without the WDM 18, the isolators 36,68, and amplifier 62, if desired.

The fibers 24,34 and the fiber laser 26 are threaded through a fiber compression device 90 (discussed more hereinafter) which accurately compresses the fiber along its longitudinal axis and prevents it from buckling. In general, the compression device 90 comprises a moving piston 92 through which the fiber 24 is threaded and a stationary portion 94 through which the fiber 34 is also threaded. Between the pistons 92 and the portion 94, the fiber laser 26 is threaded through ferrules (not shown in FIG. 1). The fiber 24 is affixed (e.g., glued or epoxied) to the moving piston 92 and the stationary portion 94 is also affixed to the fiber 34. A stepper motor 98 is connected by a mechanical linkage 100 to the piston 92 and causes the piston 92 to move and the fiber laser 26 (i.e., the gratings 28,30 and the cavity 32) to be compressed longitudinally, thereby tuning the output wavelength $\lambda_L$ of the output optical signals 33,38. The stepper motor may be a high resolution 400 steps/revolution stepper motor which may be driven in a microstepping mode of 10,000 steps/revolution, e.g., a Melles Griot NANO-MOVER micro-positioner system, which provides a linear translation resolution of +/–50 nm/step, and a wavelength resolution of +/–2 picometers, or a frequency of +/–250 MHz at 1550 nm.

The stepper motor 98 is driven by electrical signals on lines 102 from a stepper motor drive circuit 104. The drive circuit 104 contains known electronics so as to provide drive signals needed to drive the stepper motor 98, and hence the piston 92, to the desired position in response to an electronic drive signal on a line 106 indicative of the desired lasing wavelength $\lambda_L$.

Figure 2:
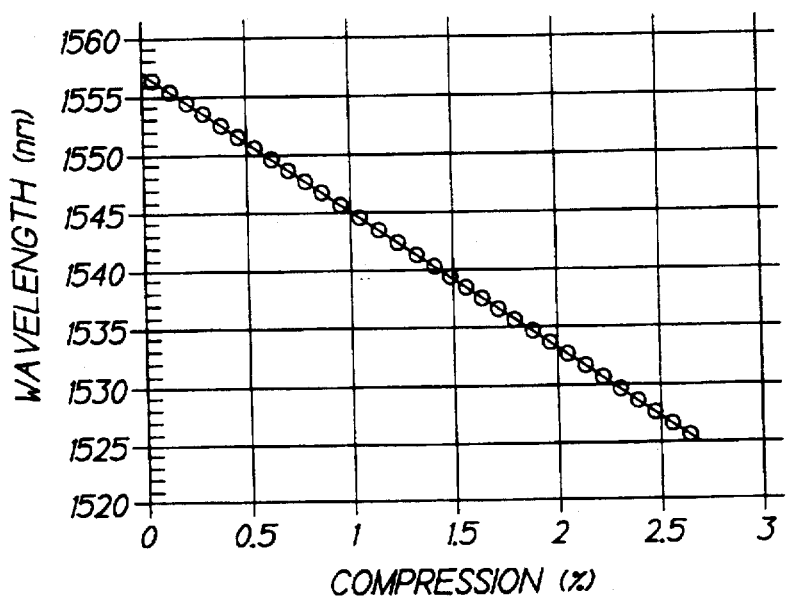
FIG. 2 is a graph of the lasing wavelength against percent compression for a compression tuned fiber laser, in accordance with the present invention.

Referring now to FIG. 2, we have found that because Silica ($SiO_2$), the major component of optical fibers is about 23 times stronger in compression than in tension, that compressing the fiber laser provides a much broader tuning range. In particular, we have seen a wavelength tuning range of 32 nm, over a compression range ($\Delta L$) of 800 microns or 2.7% compression strain (($\Delta L/L$)*100; where L is the length of fiber being compressed), which exerted a force (or load) of about 5 lbs of force on the fiber. This is a much broader wavelength tuning range than that described by prior art fiber laser tuning techniques. Also, we have found that the change in lasing wavelength remains substantially linear over the range of percent compression ($\Delta L/L$) tested, i.e., from 0 to more than 2.5%. Furthermore, compression does not run the risk of fiber breakage that occurs in the prior art technique of stretching the fiber. Other wavelengths and/or larger compression ranges may be used if desired. Also, even if some non-linear characteristics are exhibited in the output lasing wavelengths at certain higher compression values, such non-linearities may be accounted for and compensated for in the design of the force exerting device, e.g., the stepper motor, so as to provide predictable tunability of the laser over a much broader range of wavelengths than that of the prior art.

Figure 3:
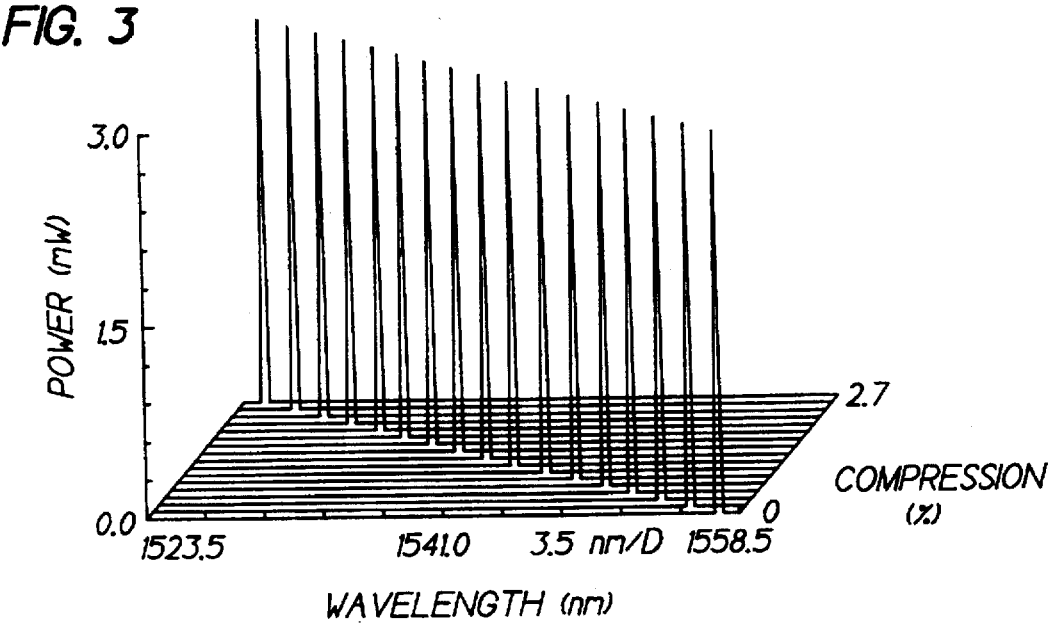
FIG. 3 is a 3D graph showing the lasing wavelength, compression and output power across the wavelength tuning range of a compression tuned fiber laser, in accordance with the present invention.

Referring now to FIG. 3, with the dual feedback arrangement shown in FIG. 1, the power of the output signal 84 is kept constant as indicated in FIG. 3 over the range of lasing wavelengths despite variations in the fiber laser 26 gain or amplifier 62 gain profile.

Figure 4:
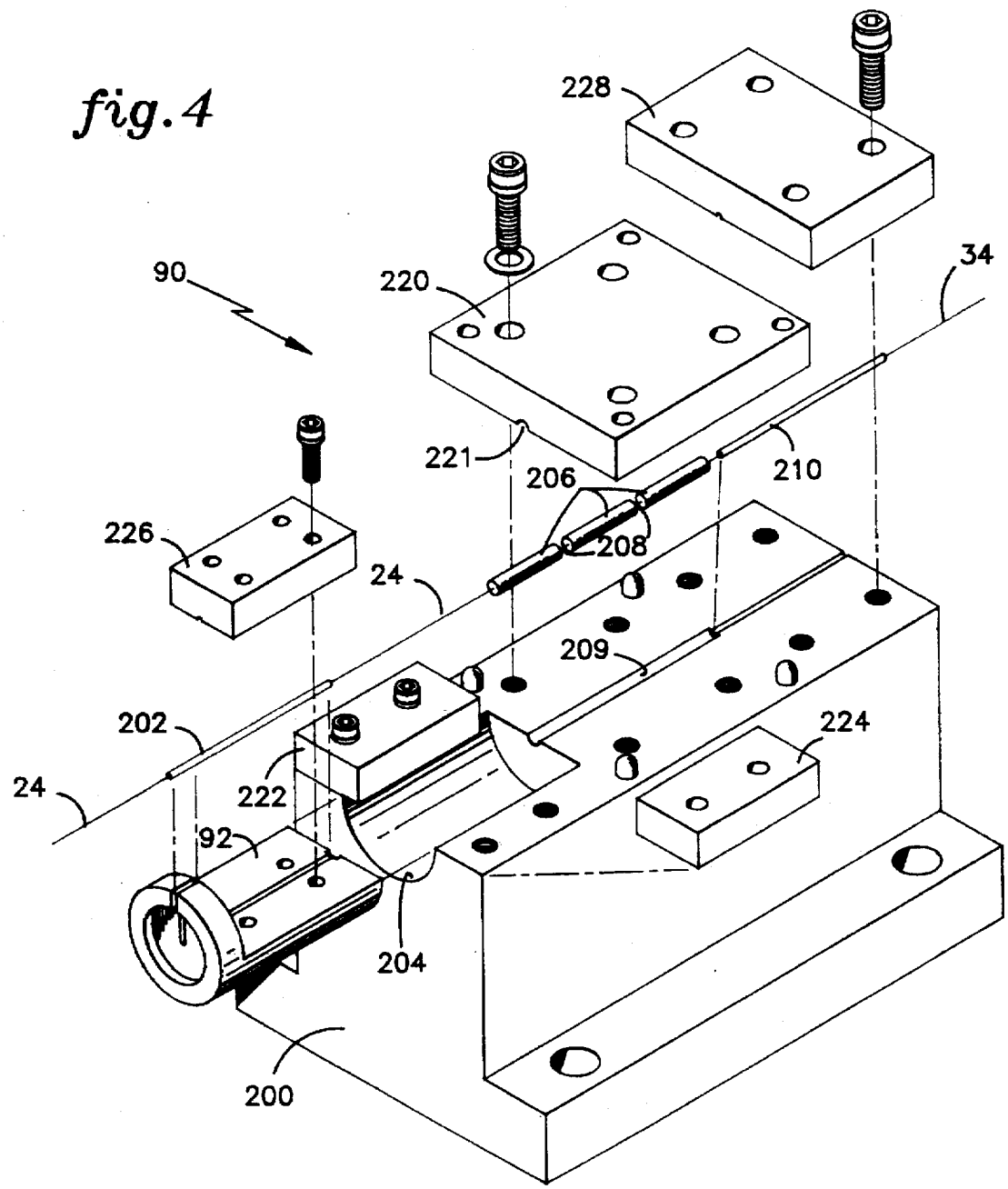
FIG. 4 is a disassembled perspective view of a compression device for compressing a fiber laser, in accordance with the present invention.
Figure 5:
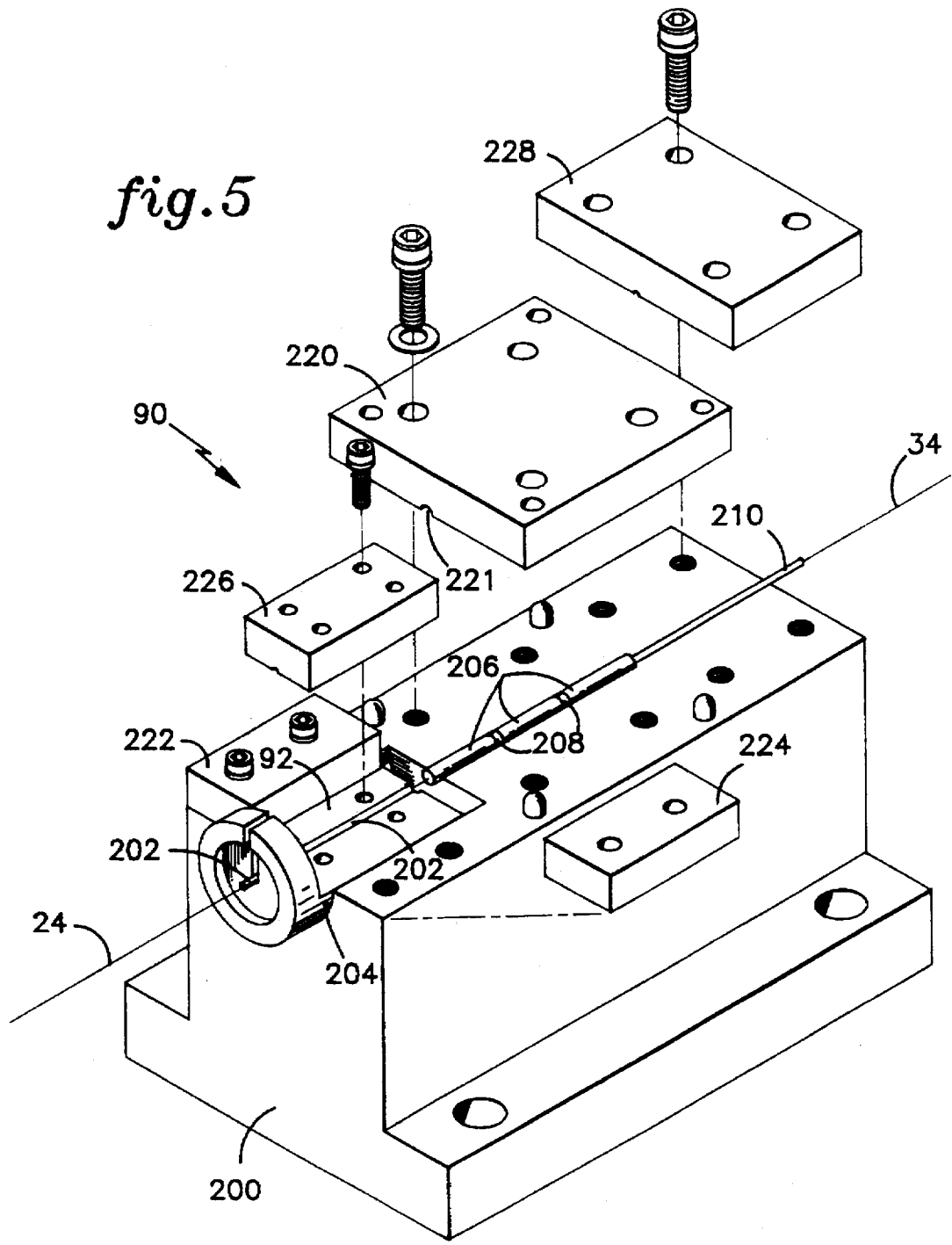
FIG. 5 is a partially disassembled perspective view of a compression device for compressing a fiber laser, in accordance with the present invention.

Referring now to FIGS. 4 and 5, one embodiment of the fiber compression device 90 discussed hereinbefore with FIG. 1 comprises a base 200 which supports the device 90 having a length of about 3.75 inches or 9.53 cm. The fiber 24 is fed through a metal tube (or sleeve) 202 which is secured to the piston 92. The piston 92, having a length of about 3.5 cm, slides along a semi-circular guide 204 in the base 200. The fiber 24 is secured to the tube 202 along the length of the tube 202 to prevent the fiber 24 from sliding during compression of the fiber laser. The fiber 24 exits the guide 202 and the fiber laser 26 (not shown) is threaded through a series of three ferrules 206, each having a length of about 1.3 cm, with pre-determined equal spaces (or gaps) 208 therebetween of about 1 mm. This allows for the portions of non-confined fiber to be spread out over the compression range to minimize the possibility of the fiber buckling.

The ferrules are free to slide along a semi-circular track 209 in the base 200. The fiber 34 from the output of the fiber laser 26 is fed to another metal tube 210 which is secured to the base 200. Also, the fiber 34 is secured to the tube 210 along the length of the tube 210 to prevent the fiber 34 from sliding during compression of the fiber 34. A cover 220, with a groove 221, is provided over the top of the ferrules 206 to stabilize them and keep them in alignment in a "clam-shell" type arrangement. The total gap over which compression occurs is approximately 3 centimeters. Other compression lengths may be used if desired. Also, other sizes and spacings 208 for the ferrules 206, and other sizes for the piston 92, base 200 and all other components of the compression device 90 may be used if desired. Also, the spacing 208 may be set to make up most of the total fiber compression if desired. Further, when the compressed fiber is released, springs (not shown) placed in the ferrule gaps 208 may be used to restore the ferrules 206 to their original positions.

The tube 202 is further secured to the piston by a cover 226 and the piston 92 is retained in the guide 204 by overhanging arms 222,224. Also, the tube 210 is further secured to the base 200 by a cover 228. To minimize the possibility of breaking the fiber at the entrance point of the tube 202 and at the exit point of the tube 210, the fiber should not be glued to the end of the tube but such gluing terminated before the end of each tube. This allows the tube to act as a sheath to limit the amount of stress placed on the fiber at the entrance and exit points of the compression device 90.

Instead of using three ferrules 206 as shown in FIGS. 4 and 5, more or less ferrules may be used if desired. Also, instead of allowing the ferrules to slide, one or more of them may be fixed to the base 200 with the fiber sliding therein. Further, the fibers 24,32,34, including the gratings 28,30 may be stripped of any coating, e.g., plastic coating, or the coating may remain on the fiber if desired, provided the coating compresses appropriately.

Also, instead of having two Bragg gratings 28,30 that bound or delimit the fiber laser cavity 32, any other type of reflective elements may be used if desired. In that case, such reflective elements, e.g., a mirror, need not change its reflection wavelength with compression, provided the reflection profile for such elements adequately reflects light over the wavelength tuning range. Also, if two broadband mirrors are used, a short cavity is likely needed to avoid mode hopping, and achieve significant wavelength tuning.

Still further, instead of a dual output laser, a single output laser may be used if desired. In that case the fiber 34 need not exit the compression device 90.

Figure 6:
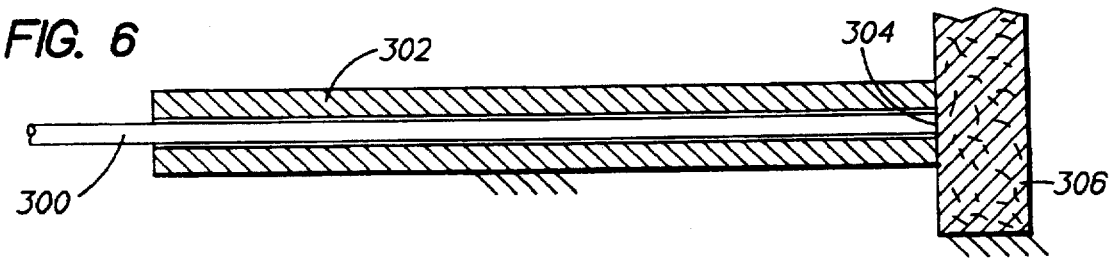
FIG. 6 is a side view of a fixed ferrule having one end blocked and a slidable fiber therein, in accordance with the present invention.

Referring now to FIG. 6, when used as a single-ended fiber laser, instead of fixing both ends of the fiber, the unused end of the fiber 300 may be threaded through a fixed (non-moving) ferrule 302 and the hole at one end of the ferrule 304 blocked by a hard surface (or plate) 306. If the plate 306 is made of Silica, back reflections from the end face of the fiber 300 are minimized.

The optical fiber of the fiber laser 26 (FIG. 1) may be made of any glass (e.g., $SiO_2$, phosphate glass, or other glasses) or glass and plastic, or solely plastic. Also, instead of an optical fiber, any other optical waveguide may be used, such as a planar waveguide, which is capable of containing and amplifying light.

Although the invention has described some specific embodiments for the compression device 90 (FIG. 1), any device which compresses fiber longitudinally may be used provided compression is obtained without the fiber buckling. Further, instead of using the stepper motor 98, any device which applies a longitudinal compressive force along the longitudinal axis of the fiber laser to change the length of the laser cavity may be used if desired.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A tunable laser, comprising:
    a laser cavity comprising a solid optical waveguide;
    said waveguide being doped with a rare-earth dopant which provides a gain medium within said laser cavity;
    a pair of reflective elements delimiting said laser cavity;
    the length of said laser cavity, the gain of said gain medium, and the reflectivity of said reflective elements being so as to cause lasing to occur at a predetermined lasing wavelength;
    said reflective elements reflecting incident light at said lasing wavelength; and
    compression means for compressing said solid optical waveguide so as to change said lasing wavelength.

2. The tunable laser of claim 1 wherein:
    said reflective elements comprise at least one Bragg grating each having a central reflection wavelength; and
    said compression means also compresses said grating, thereby changing said reflection wavelength of said grating to correspond to the lasing wavelength of the compressed laser cavity.

3. The tunable laser of claim 1 wherein said lasing wavelength is tunable over a wavelength range greater than a predetermined range, said predetermined range being: 5 nm, 10 nm, 15 nm, 20 nm, or 30 nm.

4. The tunable laser of claim 1 wherein said rare-earth dopant comprises erbium.

5. The tunable laser of claim 1 wherein said waveguide comprises optical fiber.

6. The tunable laser of claim 1 wherein said waveguide comprises Silica.

7. A method for tuning the lasing wavelength of a waveguide laser, comprising the steps of:

obtaining a laser cavity comprising a solid optical waveguide, a portion of which is doped with a rare-earth dopant; and compressing said solid optical waveguide thereby altering the length of said cavity and changing a lasing wavelength of said laser.

8. The method of claim 7 wherein said step of compressing further comprises:

compressing at least one of a pair of reflective elements delimiting said laser cavity.

9. The method of claim 7 wherein said reflective element comprises a Bragg grating.

10. The method of claim 7 wherein said waveguide comprises Silica.

11. The method of claim 7 within said lasing wavelength is tunable over a wavelength range greater than a predetermined range, said predetermined range being: 5 nm, 10 nm, 15 nm, 20 nm, or 30 nm.

* * * * *